United States Patent [19]
Barker et al.

[11] Patent Number: 5,712,059
[45] Date of Patent: Jan. 27, 1998

[54] CARBONACEOUS ELECTRODE AND COMPATIBLE ELECTROLYTE SOLVENT

[75] Inventors: Jeremy Barker; Feng Gao, both of Henderson, Nev.

[73] Assignee: Valence Technology, Inc., Henderson, Nev.

[21] Appl. No.: 740,765

[22] Filed: Nov. 1, 1996

Related U.S. Application Data

[63] Continuation-in-part of Ser. No. 630,402, Apr. 10, 1996, Pat. No. 5,643,695, which is a continuation-in-part of Ser. No. 533,882, Sep. 26, 1995, Pat. No. 5,660,948.

[51] Int. Cl.$^6$ .................................................. H01M 10/40
[52] U.S. Cl. .......................... 429/197; 429/217; 429/218
[58] Field of Search .................................. 429/197, 223, 429/224, 218, 249.252, 217; 423/448

[56] References Cited

U.S. PATENT DOCUMENTS

| | | |
|---|---|---|
| 3,871,915 | 3/1975 | Brych . |
| 4,069,374 | 1/1978 | Gabano . |
| 4,517,265 | 5/1985 | Bélanger et al. . |
| 4,668,595 | 5/1987 | Yoshino et al. . |
| 4,725,422 | 2/1988 | Miyabayashi et al. . |
| 4,945,014 | 7/1990 | Miyabayashi et al. . |
| 4,959,281 | 9/1990 | Nishi et al. . |
| 5,028,500 | 7/1991 | Fong et al. . |
| 5,130,211 | 7/1992 | Wilkinson et al. . |
| 5,176,969 | 1/1993 | Miyabayashi et al. . |
| 5,187,035 | 2/1993 | Miyabayashi et al. . |
| 5,192,629 | 3/1993 | Guyomard et al. . |
| 5,275,750 | 1/1994 | Sato et al. . |
| 5,310,553 | 5/1994 | Simon et al. . |
| 5,326,658 | 7/1994 | Takahashi et al. . |
| 5,352,548 | 10/1994 | Fujimoto et al. . |
| 5,474,862 | 12/1995 | Okuno et al. . |
| 5,484,669 | 1/1996 | Okuno et al. . |
| 5,521,027 | 5/1996 | Okuno et al. . |
| 5,525,443 | 6/1996 | Okuno et al. . |
| 5,626,981 | 5/1997 | Simon et al. ............ 429/197 X |
| 5,626,985 | 5/1997 | Shoji et al. ............. 429/197 |

OTHER PUBLICATIONS

A.N. Dey and B.P. Sullivan, "The Electrochemical Decomposition of Propylene Carbonate on Graphite", J. Electrochem. Soc., vol. 117, No. 2, 222–224, Feb. 1970.

J.R. Dahn, A.K. Sleigh, H. Shi, J.N. Reimers, Q. Zhong, and B.M. Way, "Dependence of the Electrochemical Intercalation of Lithium in Carbons on the Crystal Structure of the Carbons", Electrochimica Acta, vol. 38, No. 9, 1179–1191, 1993 (No month).

Z.X. Shu, R.S. McMillan, and J.J. Murray, "Electrochemical Intercalation of Lithium into Graphite", J. Electrochem. Soc., vol. 140, No. 4, 922–927, Apr. 1993.

J. Barker, "Three Electrode Electrochemical Voltage Spectroscopy (TEVS): Evaluation of a Model Lithium Ion System", Electrochimica Acta, vol. 40, No. 11, 1603–1608, 1995 (No month).

A. Mabuchi, K. Tokumitsu, H. Fujimoto, and T. Kasuh, "Charge–Discharge Characteristics of the Mesocarbon Microbeads heat–Treated at Different Temperatures", J. Electrochem. Soc., vol. 142, No. 4, 1041–1046, Apr. 1995.

A. Mabuchi, H. Fujimoto, K. Tokumitsu, and T. Kasuh, "Charge–Discharge Mechanism of Graphitized Mesocarbon Microbeads", J. Electrochem. Soc., vol. 142, No. 9, 3049–3051, Sep. 1995.

Z.X. Shu, R.S. McMillan, J.J. Murray, and I.J. Davidson, "Use of Chloroethylene Carbonate as an Electrolyte Solvent for a Lithium Ion Battery Containing a Graphitic Anode", J. Electrochem. Soc., vol. 142, No. 9, L161–L162, Sep. 1995.

(List continued on next page.)

*Primary Examiner*—Anthony Skapars
*Attorney, Agent, or Firm*—Linda Daschere

[57] ABSTRACT

A battery which comprises a first electrode and a counter electrode which forms an electrochemical couple with the first electrode, and an electrolyte. The first electrode comprises graphite particles and the electrolyte comprises a solvent mixture and a solute. The solvent mixture comprises vinylene carbonate (VC) or substituted derivatives thereof and propylene carbonate (PC).

25 Claims, 6 Drawing Sheets

OTHER PUBLICATIONS

T.D. Tran, J.H. Feikert, X. Song, and K. Kinoshita, "Commercial Carbonaceous Materials as Lithium Intercalation Anodes", J. Electrochem. Soc., vol. 142, No. 10, 32997–3302, Oct. 1995.

Technical Documentation for "Graphite KS 6", Lonza G&T, Ltd., (Sins, Switzerland), Apr. 1993.

Technical Documentation for "Graphite SFG 44", Lonza G&T, Ltd., (Sins, Switzerland), Apr. 1993.

Technical Documentation for "Graphite SFG 15", Lonza G&T, Ltd., (Sins, Switzerland), Apr. 1994.

Technical Documentation for "Graphite KS 15", Lonza G&T, Ltd., (Sins, Switzerland), Apr. 1994.

Technical Documentation for "Graphite KS 44", Lonza G&T, Ltd., (Sins, Switzerland), Apr. 1994.

CARBONACEOUS ELECTRODE AND COMPATIBLE ELECTROLYTE SOLVENT

CROSS-REFERENCE TO RELATED APPLICATION

This application is a continuation-in-part of application Ser. No. 08/630,402 filed Apr. 10, 1996 now U.S. Pat. No. 5,643,695, which is a continuation-in-part of U.S. application Ser. No. 08/533,882 filed Sep. 26, 1995, now U.S. Pat. No. 5,660,948.

FIELD OF THE INVENTION

This invention relates to electrochemical cells and batteries, and more particularly, to improved electrodes for such batteries.

BACKGROUND OF THE INVENTION

Lithium batteries are prepared from one or more lithium electrochemical cells. Such cells typically include an anode (negative electrode) of metallic lithium, a cathode (positive electrode) typically a transition metal chalcogenide and an electrolyte interposed between electrically insulated, spaced apart positive and negative electrodes. The electrolyte typically comprises a salt of lithium dissolved in one or more solvents, typically nonaqueous (aprotic) organic solvents. By convention, during discharge of the cell, the negative electrode of the cell is defined as the anode. During use of the cell, lithium ions (Li+) are transferred to the negative electrode on charging. During discharge, lithium ions (Li+) are transferred from the negative electrode (anode) to the positive electrode (cathode). Upon subsequent charge and discharge, the lithium ions (Li+) are transported between the electrodes. Cells having metallic lithium anode and metal chalcogenide cathode are charged in an initial condition. During discharge, lithium ions from the metallic anode pass through the liquid electrolyte to the electrochemically active material of the cathode whereupon electrical energy is released. During charging, the flow of lithium ions is reversed and they are transferred from the positive electrode active material through the ion conducting electrolyte and then back to the lithium negative electrode.

Lithium batteries, with metallic lithium electrodes, have a limited life cycle due to the degradation of the metallic lithium electrodes. Lithium is attacked and/or passivated by electrolytes. This results in formation of lithium powder with a very high surface area at the interface between the metallic lithium and the electrolyte. The formation of high surface area lithium powder is undesirable because it reacts violently with moisture and air.

It has recently been suggested to replace the lithium metal anode with a carbon anode, that is, a carbonaceous material, such as non-graphitic amorphous coke, graphitic carbon, or graphites, which are intercalation compounds. This presents a relatively advantageous and safer approach to rechargeable lithium as it replaces lithium metal with a material capable of reversibly intercalating lithium ions, thereby providing the sole called "rocking chair" battery in which lithium ions "rock" between the intercalation electrodes during the charging/discharging/recharging cycles. Such lithium metal free cells may thus be viewed as comprising two lithium ion intercalating (absorbing) electrode "sponges" separated by a lithium ion conducting electrolyte usually comprising a lithium salt dissolved in nonaqueous solvent or a mixture of such solvents. Numerous such electrolytes, salts, and solvents are known in the art. Such carbon anodes are preferably lithiated in situ. In one embodiment, such prelithiation occurs against a metallic lithium electrode which is later replaced with the cathodic active material electrode of the final cell. In another embodiment, the carbon-based negative electrode is assembled with lithium-containing cathode and/or lithium-containing electrolyte which provides the necessary lithium to form an $Li_xC$ anode in situ. In such a case, in an initial condition, such cells are not charged. In order to be used to deliver electrochemical energy, such cells must be charged in order to transfer lithium to the carbon from the lithium-containing cathode and/or electrolyte. During discharge, the lithium is transferred from the anode back to the cathode as described above.

One drawback of the carbon anode is that upon initial charging of the cell, when lithium is intercalated into the host carbon, some irreversibility occurs in which lithium and/or the cell electrolyte are consumed, resulting in an initial capacity loss for the cell and a reduction of the cell's overall performance. For example, when the anode material $Li_xC$ is prepared in situ in a cell in order to obtain a state of charge and render the anode to a reduced state, some of the lithium which is transferred to the anode upon initial charging, is irretrievably intercalated into the anode in an irreversible process. Some of the intercalated lithium is, therefore, not deintercalated from the anode during subsequent discharge resulting in the loss of capacity since lithium is not available for electrochemical interaction to produce electrical energy. The progressive loss of capacity during use is referred to as "capacity fade".

Based upon the short comings of such carbon-based cells there remains a need for electrochemical cells that are capable of providing improved performance. Therefore, what is needed is an improved anode material which is an alternative to present metallic lithium anodes and a compatible electrolyte which simultaneously fulfills the requirement of high reactivity, good charge rate capabilities, acceptable life cycle, specific rate, stability, and low cost. There is also needed an improved electrochemical cell which does not suffer the initial loss of cycling capability and the further progressive loss known as capacity fade during use.

SUMMARY OF THE INVENTION

The present invention provides an electrochemical cell or battery which has a non-metal negative electrode (anode). The battery comprises a negative electrode having an active material consisting of carbonaceous material. The novel electrolyte of the invention is usable with a variety of carbonaceous materials (carbons) providing particularly improved performance and relatively very low first cycle capacity loss when used with graphites.

The electrolyte usable with the carbonaceous active materials comprises a mixture of solvents. In one embodiment, the mixture of solvents comprises propylene carbonate (PC) and vinylene carbonate (VC). The relative proportions of PC and VC may vary. However, VC and PC must both be present. Some VC is needed to moderate the tendency of PC to attack carbonaceous active material. Some PC should be present because its low melting point is an advantage, and it promotes good ionic conductivity. Therefore, the solvent mixture comprises less than 100 percent PC and less than 100 percent VC, for example, 1:99 PC:VC to 99:1 PC:VC. In practice, a practical range is 80:20 to 20:80 of VC:PC on a weight basis. A preferred range is 2:1 to 1:2 VC:PC on a weight basis. Advantageously, it is found that good results are achieved when about equal proportions by weight of VC and PC are used. The invention also encompasses other non-saturated, cyclic, ester, vinylene carbonate-based compounds which are substituted derivatives of vinylene carbonate.

If desired, one or more additional organic solvents may be included in the solvent mixture along with the VC and PC. In one embodiment, ethylene carbonate (EC) is included in the mixture. The relative amounts of ethylene carbonate, propylene carbonate, and vinylene carbonate may vary. It is preferred that the combined amount by weight of the vinylene carbonate and the propylene carbonate exceed the amount by weight of any other organic solvent or solvents included with the mixture. In one embodiment, the relative weight proportions of VC, PC, and EC are about the same, 1:1:1. In addition to EC other organic solvents which may be included in the mixture are dimethyl carbonate (DMC), diethyl carbonate (DEC), dipropyl carbonate (DPC), dibutyl carbonate (DBC), diethoxy ethane (DEE), ethyl methyl carbonate (EMC), butylene carbonate (BC), and mixtures thereof. Regardless of the nature of the one or more additional organic solvents besides VC and PC, the one or more other organic solvents preferably have the following characteristics. The boiling point is 80° C. to 300° C. Alkyl carbonates are preferred. They dissolve inorganic lithium salts, such as $LiPF_6$. They have good (i.e., high) dielectric constant as exemplified by the range of values in Table VI. It is preferred that the by weight amount of PC be less than the combined amount of any other solvents in the solvent mixture.

The solvent mixture of the invention is usable with a wide variety of carbonaceous active material. Among the types of carbonaceous material are highly structured, highly crystalline graphitic, nearly perfect layered structures referred to as graphites. A second group of carbonaceous material (carbons) contains graphitic carbons, such as graphitized cokes. The third type of carbons are non-graphitic carbons which are considered amorphous, non-crystalline, and disordered, such as petroleum cokes and carbon black. A preferred active material consists of graphite particles having an interlayer distance spacing of 002 planes (c/2 $d_{002}$) as determined by x-ray diffraction of about 0.330 to 0.340 nanometers. The graphite particles have a crystallite size in the direction of the c-axis ($L_c$) being up to about 1000 nanometers. The parameter $L_c$ is a well known parameter defining the size of crystalline domains to characterize at least partially graphitized (ordered) carbon, and in this case, graphite. Graphite is made up of carbon layers of approximate dimension $L_a$ in the a-b plane and $L_c$ in the c-axis direction as defined above which designate the regions which scatter coherently within themselves x-rays. As used herein, the designation $L_c$ refers to the direction in the c-axis of the size of a region which scatter x-rays coherently, similarly, $L_a$ refers to the a-b plane. Accordingly, each ordered, crystalline, carbon grain is made up of many small regions, each characterized by $L_a$ and $L_c$, which scatter x-rays incoherently with respect to one another, that is, region to region.

Preferably, the graphite particles are further characterized by 90 percent by weight of such particles having a size less than about 48 or 50 microns, desirably less than about 24 or 25 microns, and preferably 90 percent by weight of the graphite particles having a size less than about 25 microns. Most preferably, the graphite particles are characterized by a median size ($d_{50}$) of about 3 microns to about 23 microns. The invention will be described further below with reference to the preferred graphites according to the criteria defined immediately above. However, it is to be understood that the electrolyte solvent mixture of the invention is used with a variety of carbonaceous active materials.

The specific surface area of the preferred graphite particles, as determined by the Brunauer-Emmett-Teller (BET) method, is preferably on the order of about 4 to about 23 square meters per gram, and preferably in a range of about 6 to about 12 square meters per gram.

In preparing a battery constituting the negative electrode described above and the electrolyte, essentially any counter electrode may be selected so long as it is capable of reacting electrochemically with the graphite negative electrode material. Preferred are lithium transition metal oxide compounds. The negative electrode and positive electrode are assembled in a battery with an electrolyte which provides ionic conductivity between the positive and negative electrode. Typically and preferably, the electrolyte is in the form of an electrolyte separator which further comprises a solid matrix forming a network with voids interpenetrated by the solvent mixture, and a solute. Essentially any type of electrolyte separator arrangement may be selected so long as the solvent consists of the preferred organic solvents mentioned above. In one embodiment, the electrolyte separator has a solid matrix which is a polymeric acrylate formed from acrylate precursors which are applied to a surface of the cathode or anode and then polymerized to form an electrolyte/electrode composite. In another embodiment the matrix is a porous polypropylene or polyethylene sheet or a sheet of fiber glass material placed between the anode and cathode. The nature of the electrolyte separator is not critical so long as it is used with the solvent mixture of the invention along with the stated graphite negative electrode defined by the invention.

Objects, features, and advantages of the invention include an improved electrochemical cell or battery based on alkali metal, and preferably lithium, which has improved charging and discharging characteristics; a large discharge capacity; and which maintains its integrity over a prolonged life cycle as compared to presently used anodes. Another object is to provide an electrolyte mixture which is stable with respect to the graphite negative electrode, which demonstrates high performance, and which does not readily decompose or evaporate. Still another object is to provide an anode active material which is an alternative to metallic alkali anodes, lithium, sodium, potassium, and particularly lithium anodes. It is also an object of the present invention to provide cells which can be manufactured more economically and relatively more conveniently and safely than present carbon-based and lithium anodes. And to provide cells with carbon-based anodes that are compatible with electrolytes which avoid problems with undesired reactivity.

These and other objects, features, and advantages will become apparent from the following description of the preferred embodiments, claims, and accompanying drawings.

DETAILED DESCRIPTION OF THE PREFERRED EMBODIMENTS

Figure 1:
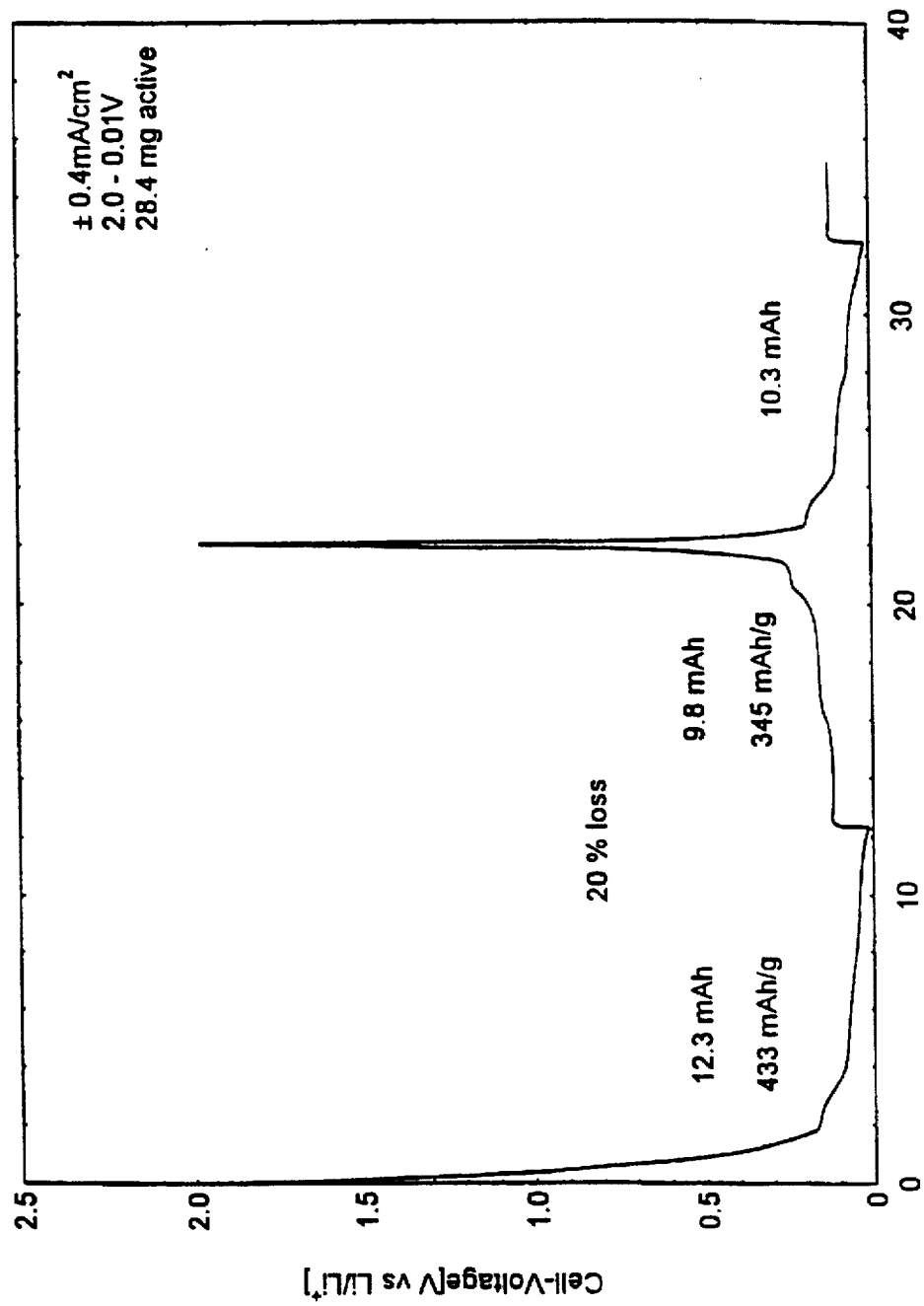
FIG. 1 is a voltage/capacity plot of SFG-15 graphite cycled with a lithium metal anode using constant current cycling at ±0.4 milliamps per square centimeter, between 2.0 and 0.01 volts, using 28.4 milligrams of the SFG-15 active material. The electrolyte is 1 molar $LiPF_6$ in 50:50 by weight VC:PC solvent.

The present invention provides an electrochemical cell or battery, which has a non-metal negative electrode (anode). That is, no solid metal active material is used in the cell. Rather than the conventional solid lithium metal anode, the active material of the new anode comprises a carbon powder having unique operating advantages when used in combination with a specifically selected compatible electrolyte.

Before describing the invention, it is useful to understand the problems associated with present carbon anode batteries which deter their use.

Generally, the carbonaceous materials (carbons) known to be usable as intercalation carbon anode materials may, for discussion purposes, be classified in several distinct groups. One group contains highly structured, highly crystalline, highly graphitic, anisotropic graphites having a nearly perfect layered structure and preferably formed as synthetic graphites and heat treated up to about 3000° C. Examples are the SFG series of synthetic graphites and the KS series of synthetic graphites as supplied by the manufacturer Lonza G. & T., Limited (Sins, Switzerland). A second distinct group contains graphitic carbons which have relatively very large crystal size ($L_c$ greater than 2000) and are fully graphitized, typically, graphitized cokes, such as, supplied under the name Super SG and BG by Superior Graphite Corporation (USA). A third class of carbons are non-graphitic carbons. These are considered amorphous, non-crystalline, disordered, and are generally petroleum cokes and carbon blacks, such as, supplied by Lonza under the designation FC-250 and Conoco (USA) under the designation X-30. They have a turbostratic structure, show a steep voltage profile and intercalate only up to 0.5 Li per $C_6$ ($Li_{0.5}C_6$, $LixC_{12}$).

Lithiated petroleum coke ($Li_xC_{12}$) is usable in combination with a variety of electrolytes without excessive deterioration of the electrolyte solvent. However, the performance of such lithiated petroleum cokes is relatively poor due to sloping voltage profile and limited intercalation capacity.

Graphite has a higher lithium intercalation/deintercalation capacity, theoretically about $LiC_6$. It has double the intercalation capacity, and a flat voltage curve near zero volts relative to lithium. The theoretical capacity of a graphite anode is 372 mAh/g based upon a stoichiometry of $LiC_6$. Despite these theoretical advantages, graphites have not found favor for use in lithium batteries. This is because the use of graphite as a negative electrode material presents a problem when graphite is used with a preferred propylene carbonate electrolyte solvent. Cells containing graphite and propylene carbonate and other similar electrolytes suffer from very poor reversible capability during delithiation (deintercalation). In addition, electrolyte decomposition occurs, and significant gas is released, posing a safety risk. The electrolyte decomposition is thought to be because graphite has many active sites in its structure as compared with graphitic carbon (having large crystallized size $L_c$ greater than 1,000 to 2,000), and as compared to cokes which are amorphous.

It has been found that if a graphite negative electrode is used in an electrolyte containing propylene carbonate as the solvent, the solvent is apparently absorbed into the active sites of the graphite negative electrode and readily generates gas through decomposition. As a result, the decomposition of the solvent prevents lithium ion as an active material from intercalating into the graphite on charging the battery and causes an increase in polarization; consequently, the battery capacity is decreased. In other words, it is thought that the graphite is catalytic and causes breakdown of propylene carbonate. Such decomposition of the propylene carbonate results in the evolution of the gas, probably propylene.

In view of the difficulties mentioned above, propylene carbonate is usable only with non-graphitic anodes and is not usable with crystalline, ordered planar structure graphitic anodes. It has recently been suggested to use dimethyl carbonate (DMC) in combination with ethylene carbonate (EC) for any type of carbonaceous anode. See for example U.S. Pat. Nos. 5,352,548 and 5,192,629, each of which is incorporated by reference in its entirety. Moreover, such electrolyte is undesirable since the DMC readily evaporates leaving behind the EC which quickly solidifies, rendering the cell useless.

Commonly owned application Ser. No. 08/553,882 described a highly crystalline graphite material sold under the designation SFG-15 that works better than any other commonly known graphites, with the solvent consisting of ethylene carbonate and dimethyl carbonate (EC/DMC). This solvent demonstrated good capacity and relatively low capacity loss as compared to conventional solvents containing propylene carbonate. Commonly owned application Ser. No. 08/630,402 described carbons having specific characteristics which led to very low first cycle capacity loss when used in combination with a mixed solvent comprising propylene carbonate (PC), ethylene carbonate (EC), and optionally one or more other organic solvents having a boiling point less than the boiling point of ethylene carbonate (EC).

As a result of further work, it has now been determined that vinylene carbonate when added to propylene carbonate provides a solvent which works well not only with certain graphites having key characteristics defined in the earlier work, but significantly the combination of VC/PC works well with a wide variety of carbonaceous materials and to this point has been tested successfully. There have not been found any carbonaceous materials, graphites, which do not function well with the unique VC/PC solvent mixture of the invention. The present invention is surprising, particularly in view of the aforementioned '548 patent which recommends that vinylene carbonate only be used in combination with a low boiling point solvent having a boiling point lower than 150° C. Examples of the '548 patent co-solvents are DME and EME. The '548 patent explicitly excludes PC, BC, and EC. PC and BC are described as decomposing graphite based anodes. EC is discarded by '548 because of its tendency to solidify and its poor performance at relatively low temperature. The present invention finds success with a solvent mixture which Fong's U.S. Pat. No. 5,352,548, recommends against.

The electrolyte usable with the carbonaceous active materials comprises a mixture of solvents. In one embodiment, the mixture of solvents comprises propylene carbonate (PC) and vinylene carbonate (VC). The relative proportions of PC and VC may vary. However, VC and PC must both be present. Some VC is needed to moderate the tendency of PC to attack carbonaceous active material. Some PC should be present because its low melting point is an advantage, and it promotes good ionic conductivity. Therefore, the solvent mixture comprises less than 100 percent PC and less than 100 percent VC, for example, 1:99 PC:VC to 99:1 PC:VC. In practice, a practical range is 80:20 to 20:80 of VC:PC on a weight basis. A preferred range is 2:1 to 1:2 VC:PC on a weight basis. Advantageously, it is found that good results are achieved when about equal proportions by weight of VC and PC are used. The invention also encompasses other non-saturated, cyclic, ester, vinylene carbonate-based compounds which are substituted derivatives of vinylene carbonate. The group consists of vinylene carbonate and derivatives thereof formed by substitution of one or both hydrogen atoms with a substituent which is selected to maintain a solidifying point (melting point) lower than that of ethylene carbonate, that is, lower than about 40° C. Such substituted derivatives are also characterized by resistance to decomposition similar to that of the parent vinylene carbonate. The vinylene carbonate is an oxycompound having a carbon-carbon double bond. At each such double bonded carbon there is a hydrogen. The structure of vinylene carbonate is shown in U.S. Pat. No. 5,275,750, entirely incorporated herein by reference, where it is used as a monomer in a polymerization reaction. The substituted derivatives of vinylene carbonate are obtained by replacing one or both of such hydrogens with a substituent. The substituent desirably is selected from the group consisting of alkyls and halogens, such alkyls preferably having 1 to 3 carbon atoms, and most preferably being a methyl or an ethyl group, and such halogens preferably being chlorine or fluorine. If both hydrogens are replaced by a substituent, such substituent may be the same or different.

If desired, one or more additional organic solvents may be included in the solvent mixture along with the VC and PC. In one embodiment, ethylene carbonate (EC) is included in the mixture. The relative amounts of ethylene carbonate, propylene carbonate, and vinylene carbonate may vary. It is preferred that the combined amount by weight of the vinylene carbonate and the propylene carbonate exceed the amount by weight of any other organic solvent or solvents included with the mixture. In one embodiment, the relative weight proportions of VC, PC, and EC are 1:1:1.

The vinylene carbonate has a boiling point of approximately 162° C. and a melting temperature of approximately 22° C. It is a ringed structure. The propylene carbonate has a boiling point of approximately 240° C. and a melting temperature of approximately −49° C. It is also a ringed structure. Other characteristics are as shown in Table VI.

According to the Chapman and Hall chemical database, vinylene carbonate is also known as 1,3-dioxol-2-one, its CAS registry number is 872-36-6. Its molecular formula representation is $C_3H_2O_3$ and it has a molecular weight of 86.047. Its physical state is liquid, its melting point is 22° C., its boiling point is 162° C., and its relative density is 1.35 at 25° C.

The ethylene carbonate has a boiling point of 248° C., a melting temperature of about 39° C. to about 40° C., and is also a ringed structure. Aside from the optional ethylene carbonate, the solvent mixture's third component may comprise dimethyl carbonate (DMC), diethyl carbonate (DEC), dipropyl carbonate (DPC), dibutyl carbonate (DBC), diethoxy ethane (DEE), ethyl methyl carbonate (EMC), butylene carbonate (BC), and mixtures thereof. Accordingly, it is preferred that if one or more additional organic solvents are added to the basic VC/PC mixture of the invention, that such added organic solvent have the following characteristics. The boiling point is 80° C. to 300° C. Alkyl carbonates are preferred. They dissolve inorganic lithium salts, such as, $LiPF_6$. They have good (i.e., high) dielectric constant as exemplified by the range of values in Table VI. It is preferred that the by weight amount of PC be less than the combined amount of any other solvents in the solvent mixture.

Except for the present invention, there is not known to be a successful use of a propylene carbonate-based electrolyte solvent in combination with graphite anode active material. Therefore, the invention provides, for the first time, graphite negative electrode active material which is successfully usable in combination with a solvent comprising vinylene carbonate and propylene carbonate, which maintains a high reversible specific capacity, and demonstrates minimal first cycle capacity loss, heretofore unexpected and surprising in view of the difficulties posed by graphite anodes operating in the presence of propylene carbonate.

The present invention provides an electrochemical cell or battery which has a heretofore unexpected first cycle capacity loss of less than about 25 percent of the first cycle charge capacity, and which is characterized by a negative electrode having a reversible capacity of greater than about 340 milliamp hours per gram (mAh/g). Advantageously, the cells of the invention having the specific graphite of the invention demonstrate reversible specific capacity of 344 to 351 milliamp hours per gram and a first cycle capacity loss in a range of 20 percent to 25 percent. Advantageously, a variety of graphites exhibit this favorable behavior. Two types of graphite material used in the test demonstrating the invention are sold under the designations SFG and KS by Lonza G. & T., Limited (Sins, Switzerland). The carbon active materials and preferred graphites have characteristics as shown in Tables I through V.

Each of the exemplary graphites of the invention have an interlayer distance spacing of 002 planes of preferably 0.3354 to 0.3359. This interlayer distance spacing is designated in the literature as c/2 or $d_{002}$. Each of the above graphites is anisotropic, which means that one or more fundamental physical properties, for example, electronic resistivity, varies with direction. The specific graphites designated above as SFG and KS have high anistropy.

Physical features of the carbons, as defined above, are obtained by measurements from x-ray wide angle diffraction. Analysis of x-ray diffraction by crystals is well known in the art. According to analysis by Bragg diffraction, any set of equally spaced planes in a crystal acts as a set of mirrors for x-rays; for constructive interference, the beam must be incident on a set of planes that such a glancing angle $\theta$ indicated by: $2d\theta = m\lambda$, where d is the distance between planes and m is an integer. Therefore, as is well known in the art, the lattice constance for carbon material is determinable from 002 lines. Crystallite size along the c-axis ($L_c$) and the a-axis ($L_a$) is determinable from half widths of 002 and 110 lines, respectively, by x-ray diffraction with an internal standard. A typical internal standard for carbon analysis is silicon used with $CUK\alpha$ radiation. A description of the x-ray wide angle diffraction analysis method is given in U.S. Pat. No. 4,945,014 incorporated herein by reference in its entirety. The term "$d_{002}$" is used interchangeably with the term "C/2". From methods such as described in the '014 patent, one is able to obtain lattice constant, a, the average plane spacing, $d_{002}$ (C/2), and the size of the crystallite domains, $L_a$ and $L_c$, to character carbons. $L_a$ and $L_c$ are normally determined using the Scherrer equations as defined in the '014 patent incorporated herein by reference. Using the widths of the 002 and 110 peaks it is possible to obtain values for $L_a$ and $L_c$ as shown in Column 14 of U.S. Pat. No. 4,945,014 previously incorporated by reference in its entirety. Such analysis is based on the understanding that each carbon grain is made up of many small regions characterized by $L_a$ and $L_c$, which scatter x-rays incoherently with respect to one another; the small regions which scatter coherently within themselves are defined by $L_a$ and $L_c$.

In one embodiment, the lithium battery of the invention does not contain any metallic lithium. Such battery or cell comprises the electrolyte, positive electrode having an intercalation active material, and a negative electrode comprising the specific graphite of the invention. The graphite of the invention is in an initial condition, before charge (precharge) state or fully discharged state. In a lithiated, partially or fully charged state, the graphite active material is rendered to a state of charge represented by $Li_xC_6$ where x is greater than 0 and less than or equal to 1. Since the negative electrode is graphite without any lithium in an initial before charge state it is necessary to provide lithium for cell operation preferably in situ from the metallic lithium counter electrode which is then removed and replaced by the desired cathode intercalation active material; or from another component of the cell such as from a lithium-containing insertion compound of the cathode or a lithium-containing electrolyte.

In one embodiment, the lithium is provided in situ from the cathode (positive electrode) which is a lithium-containing compound. The positive electrode contains either a lithiated insertion compound or a lithium compound able to deintercalate lithium to provide lithium ions for transport to the negative electrode. During an initial charge of the cell, the positive electrode deintercalates lithium for intercalation into the negative electrode, and during discharge the positive electrode inserts lithium while lithium is extracted from the graphite negative electrode. The process is repeated during subsequent charge and discharge. Examples of such lithium-containing compounds are lithium transition metal chalcogenide compounds.

The term "chalcogenide" is generally taken to indicate compounds of oxygen, sulfur, selenium, and tellurium, accordingly, lithium transition metal oxygen compounds are included. Representative examples are $Li_xMn_2O_4$, $LiCoO_2$, $LiNiO_2$, $LiNiVO_4$, $LiCoVO_4$, mixtures such as $LiCoNiO_2$ and $LiTmO_2$ where Tm is a transition metal or combinations of transition metals, and mixtures thereof. In a desirable embodiment, the positive electrode is a lithium metal oxide such as lithium manganese oxide. The cathode preferably is $Li_xMn_2O_4$ with x equal to 1 in an as prepared, initial condition. The positive electrode active material (cathode) is characterized by its ability to deintercalate lithium ions during charge so that lithium ions may be intercalated into the graphite negative electrode. During charging of the battery, the quantity x in the positive electrode $Li_xMn_2O_4$ declines from about 1 down to about 0. In the ideal case, all of the lithium would be deintercalated from the positive electrode and the value of x would decline to 0. Since some of the lithium may not be deintercalated during cell operation, subsequent charge and discharge, the value of x generally varies, with x being greater than 0 and less than or equal to 1.

In an alternative embodiment, the electrolyte comprises a lithium compound from which lithium ions may be released for intercalation, in situ, into the uncharged graphite negative electrode. A preferred lithium compound of the electrolyte is a lithium salt. Examples include $LiPF_6$, $LiAsF_6$, $LiBF_4$, $LiClO_4$, and $LiCF_3SO_3$.

In still another embodiment, some portion of the lithium intercalated into the graphite negative electrode upon charge is supplied by the lithium compound contained in the electrolyte, and some portion of the lithium is supplied to the negative electrode during charge by deintercalation from the positive electrode active material.

As can be seen from the embodiments described above, advantageously the cell may be prepared in a discharged condition. In another embodiment, the negative electrode graphite is prepared in a precharged condition either external of the cell, or internally in the cell against a metallic lithium counter electrode where such metallic electrode is then replaced with the cathode material described hereinabove. The desired electrochemical battery is prepared using this prelithiated graphitic anode in combination with the desired cathode containing the desired positive electrode active material, forming the battery (cell) of the invention.

Figure 4:
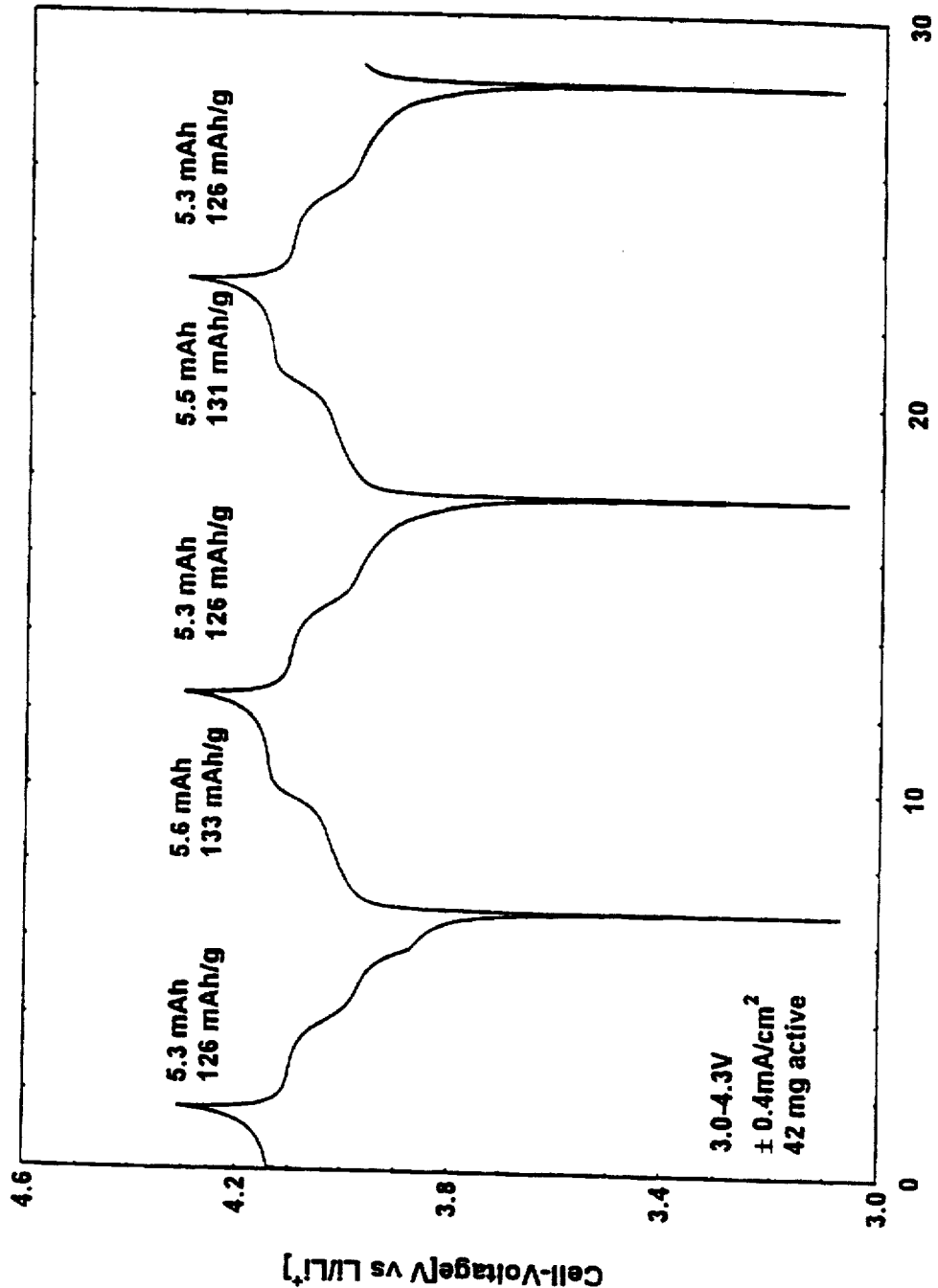
FIG. 4 is a voltage/capacity plot of lithium manganese oxide cycled with a lithium metal anode using constant current cycling at ±0.4 milliamps per square centimeter, between 3.0 and 4.3 volts, using 42.0 milligrams of the lithium manganese oxide active material. The electrolyte is 1 molar $LiPF_6$ in 50:50 by weight VC:PC solvent.
Figure 5:
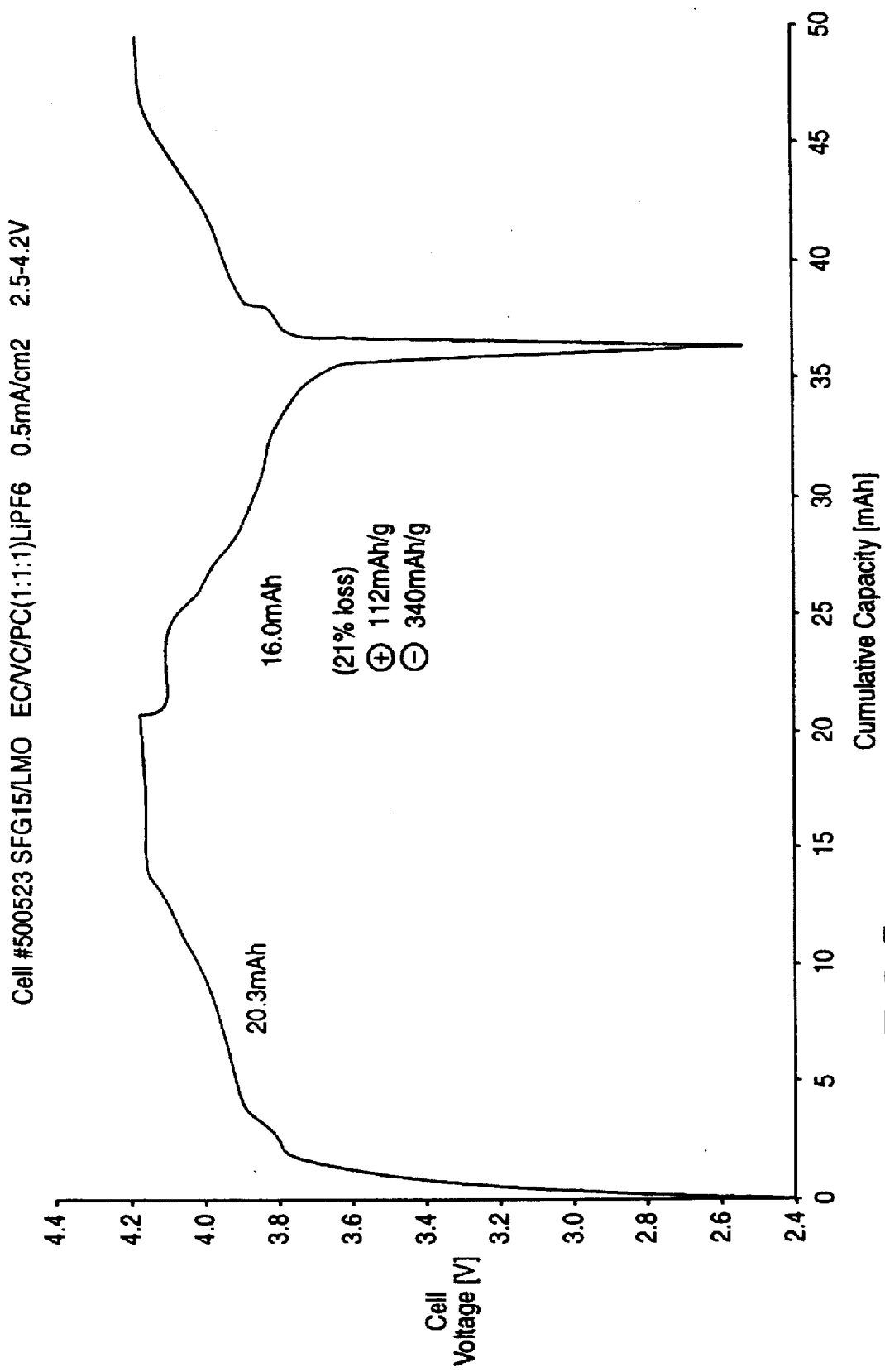
FIG. 5 is a voltage/capacity plot of lithium manganese oxide cathode cycled with an SFG-15 graphite anode using constant current cycling at ±0.5 milliamps per square centimeter, between 2.5 and 4.2 volts, using equal proportions by weight of EC/VC/PC solvent and 1 molar $LiPF_6$ salt. The amount of active material in the cathode was 143 milligrams and in the anode was 47 milligrams.
Figure 6:
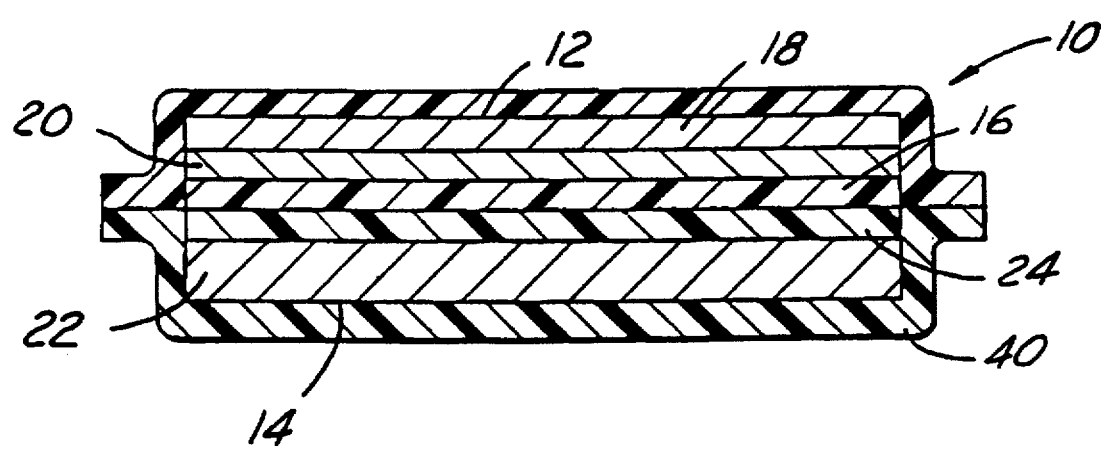
FIG. 6 is an illustration of a cross section of a thin battery or cell embodying the invention.

Graphite and lithium metal oxide electrode active materials were prepared and tested in electrochemical cells with the novel electrolyte and the results are reported in FIGS. 1 to 5. A typical cell configuration will be described with reference to FIG. 6. The following is a brief description of the electrochemical cell or battery which uses the novel active material and electrolyte of the invention. By convention, an electrochemical cell comprises a first electrode, a counter electrode which reacts electrochemically with the first electrode, and an electrolyte which is capable of transferring ions between the electrodes. A battery refers to one or more electrochemical cells. Referring to FIG. 6, an electrochemical cell or battery 10 has a negative electrode side 12, a positive electrode side 14, and an electrolyte/separator 16 therebetween. The negative electrode side includes current collector 18, typically of nickel, iron, stainless steel, and copper foil, and negative electrode active material 20. The positive electrode side includes current collector 22, typically of aluminum, nickel, and stainless steel, and such foils may have a protective conducting coating foil, and a positive electrode active material 24. The electrolyte/separator 16 is typically a solid electrolyte, or separator and liquid electrolyte. Solid electrolytes typically refer to polymeric matrixes which contain an ionic conductive medium. Liquid electrolytes typically comprise a solvent and an alkali metal salt which form an ionically conducting liquid. In this latter case, the separation between the anode and cathode is maintained, for example, by a relatively inert layer of material such as glass fiber. The electrolyte is not an essential feature of the invention. Essentially, any lithium ion containing conducting electrolyte may be used. Essentially any method may be used to maintain the positive and negative electrodes spaced apart and electrically insulated from one another in the cell. Accordingly, the essential features of the cell are the positive electrode, a negative electrode electrically insulated from the positive electrode, and an ionically conducting medium between the positive and negative electrodes. Examples of a suitable separator/electrolyte, solvents, and salts are described in U.S. Pat. No. 4,830,939 showing a solid matrix containing an ionically conducting liquid with an alkali metal salt where the liquid is an aprotic polar solvent; and U.S. Pat. Nos. 4,935,317; 4,990,413; 4,792,504; 5,037,712; 5,463,179; and 5,482,795. Each of the above patents is incorporated herein by reference in its entirety. Protective bagging material 40 covers the cell and prevents infiltration of air and moisture. In one embodiment, the electrolyte/ separator comprises a solid polymeric matrix formed by polymerizing an organic or inorganic monomer which when used in combination with the other components of the electrolyte, renders the electrolyte solid. See, for example, U.S. Pat. No. 4,925,751, which is incorporated herein by reference.

A particularly preferred solid polymeric matrix electrolyte is prepared from 36.26 grams of propylene carbonate, 3.45 grams of trimethyl propyl triacrylate, 36.26 grams of vinylene carbonate, and 13.79 grams of urethane acrylate which are combined at room temperature until homogenous. Then, 1.47 grams of polyethylene oxide film forming agent having a number average molecular weight of about 600,000 (available as Polyox WSR-205 from Union Carbide Chemicals and Plastics, Danbury, Conn.) is added to the solution and then dispersed while stirring. The solution is then heated until the film forming agent is dissolved. The solution is then cooled to a temperature less than 48° C. and then 8.77 grams of $LiPF_6$ (metal salt) are added to the solution while thoroughly mixing. The solution is preferably then degassed to provide for an electrolyte solution wherein little, if any, of the $LiPF_6$ salt decomposes. Next, the electrolyte mixture is coated by a slot die coater or other variety of coater to a thickness of about 25 to 50 microns onto the surface of a dried electrode slurry, and preferably applied to the dried cathode slurry. In such a case, the solid electrolyte cell is assembled by laminating the anode half cell component to the cathode half cell component so that the electrolyte is positioned between the anode and the cathode.

In another embodiment, the electrolyte used to form the completed cell is a combination of VC/PC and optionally one or more other organic solvents. The positive and negative electrodes are maintained in a separated condition using a fiber glass layer or a layer of porous polypropylene or porous polyethylene, about 25 microns thick. An example of a separator is sold under the designation Celgard™. Hoechst-Celanese Corp., Celgard 2400™, porous polypropylene, 25 microns thick.

The electrolyte composition typically comprises from about 5 to about 25 weight percent of the inorganic salt based on the total weight of the electrolyte; preferably, from about 10 to 20 weight percent; and even more preferably from about 10 to about 15 weight percent. The percentage of salt depends on the type of salt and electrolyte solvent employed. For liquid electrolytes, the electrolyte composition typically comprises from about 80 to about 99 weight percent and preferably from about 85 to about 95 weight percent electrolyte solvent based on the total weight of the electrolyte. For solid electrolytes, the electrolyte composition typically comprises from about 40 to about 80 weight percent electrolyte solvent based on the total weight of the electrolyte; preferably from about 60 to about 80 weight percent; and even more preferably about 72 weight percent. For solid electrolytes, the electrolyte composition typically comprises from about 5 to about 30 weight percent of the solid polymeric matrix based on the total weight of the electrolyte and preferably comprises from about 10 to about 20 weight percent.

Various methods for fabricating electrochemical cells and for forming electrode components are described herein. The invention is not, however, limited by any particular fabrication method as the novelty lies in the unique solvent mixture, especially when combined with particular graphite materials. Accordingly, additional methods for preparing electrochemical cells and batteries may be selected and are described in the art, for example, in U.S. Pat. Nos. 5,435,054 (Tonder & Shackle); 5,300,373 (Shackle); 5,262,253 (Golovin); 4,668,595; and 4,830,939 (Lee & Shackle). Each of the above patents is incorporated herein by reference in its entirety.

EXAMPLE

The positive electrode containing $LiMn_2O_4$ was prepared by the following method. For the positive electrode, the content was as follows: 50 to 90 percent by weight active material ($LiMn_2O_4$); 5 to 30 percent carbon black as the electric conductive diluent; and 3 to 20 percent binder preferably chosen to enhance ionic conductivity. The stated ranges are not critical. The amount of active material may range from 25 to 85 weight percent. The formation of each electrode will now be described. The positive electrode was prepared from mixtures of lithium-manganese oxide (active material) and EPDM (ethylene propylene diene monomer) as the binder. Shawinigan Black® was used as the carbon powder conductive diluent. The carbon powder conductive diluent is used to enhance electronic conductivity of the lithium-manganese oxide. Shawinigan Black®, available from Chevron Chemical Company, San Ramone, Calif., has a BET average surface area of about 70±5 square meters per gram. Other suitable carbon blacks are sold under the designation Super P™ and Super S™ available from MMM, a subsidiary of Sedema, which carbons have BET surface areas of about 65±5 square meters per gram. (MMM Sedema, S. A., has its headquarters in Brussels, Belgium.) Examples of suitable polymeric binders include EPDM (ethylene propylene diene termonomers), PVDF (polyvinylidene difluoride), ethylene acrylic acid copolymer, EVA (ethylene vinyl acetate copolymer), copolymer mixtures, and the like. It is desirable to use either PVDF available from Polysciences Corporation with a molecular weight of 120,000 or EPDM available from Exxon Corporation and sold under the designation EPDM 2504™. EPDM is also available from The Aldrich Chemical Company. The description of carbon powders and binders constitute representative examples and the invention is not limited thereby. For example, other carbon powders are available from Exxon Chemicals, Inc., Chicago, Ill. under the trade name Ketjen Black EC 600 JD® and polyacrylic acid of average molecular weight 240,000 is commercially available from BF Goodrich, Cleveland, Ohio under the name Good-Rite K702™. The positive electrodes of the invention comprised mixtures of the active material $LiMn_2O_4$, the binder (EPDM), and the carbon particles (Shawinigan Black®). These were mixed and blended together with a solvent. Xylene is a suitable solvent. The mixture was then coated onto an aluminum foil current collector to achieve a desired thickness for the final electrode.

The preferred $Li_xMn_2O_4$ powders which form the basis of the active material for the cathode, can be prepared by a method as described by Barboux, Tarascon et al in U.S. Pat. No. 5,135,732, issued Aug. 4, 1992 and incorporated by reference in its entirety. This reference is illustrative of a suitable method and is not limiting. This method produced active material of the nominal general formula $Li_xMn_2O_4$. The term "nominal general formula $Li_xMn_2O_4$" represents a family of suitable $LiMn_2O_4$ type compositions including those with the defect spinel with a higher average oxidation state than the typical stoichiometric $LiMn_2O_4$. Other spinel type materials are suitable, such as, $Li_2Mn_4O_9$ and $Li_4Mn_5O_{12}$ as well as chemical manganese dioxide, a mixture $\gamma/\beta MnO_2$, and lithiated spinels.

The negative electrode of the invention preferably comprises about 80 to about 95 percent by weight of the specific graphite particles, and more preferably about 90 percent by weight with the balance constituted by the binder. Preferably, the anode is prepared from a graphite slurry as follows. A polyvinylidene difluoride (PVDF) solution was prepared by mixing 300 grams of 120,000 MW PVDF (PolyScience) in 300 ml of dimethyl formamide. The mixture was stirred for 2 to 3 hours with a magnetic stirrer to dissolve all of the PVDF. The PVDF functions as a binder for the graphite in the anode. Next, a PVDF/graphite slurry was prepared by first adding 36 grams of graphite (SFG-15, KS-15, OR KS-10) into about 38.5 grams of the PVDF solution. The mixture was homogenized with a commercial homogenizer or blender. (For example, Tissue Homogenizer System from Cole-Parmer Instrument Co., Niles, Ill.). The viscosity of the slurry was adjusted to about 200 cp with additional PVDF solution. The slurry was coated onto a bare copper foil by standard solvent casting techniques, such as by a doctor blade type coating. (Alternatively, the slurry can be coated onto a copper foil having a polymeric adhesion promoter layer, described above.) In preparing the slurry, it is not necessary to grind or dry the graphite, nor is it necessary to add conductive carbon black to the graphite anode formulation. Finally, the electrodes are dried at approximately 150° C. for 10 hours to remove residual water prior to making the electrochemical cells.

The electrolyte used to form the completed cells as tested in FIGS. 1 through 4 comprised vinylene carbonate and propylene carbonate in a ratio of 1:1 by weight (1VC:1PC, by weight). The respective FIGS. 1, 2, 3, and 4 show, respectively, SFG-15, KS-15, KS-10, and $LiMn_2O_4$ active materials cycled against metallic lithium using the VC/PC electrolyte. The two electrodes were maintained in a separated condition using a fiber glass layer. The electrolyte salt in each case was a concentration of 1 molar $LiPF_6$ providing a liquid electrolyte which interpenetrated the void spaces of the fiber glass layer. FIG. 5 shows test data from a cell having 1 molar $LiPF_6$ in a solvent mixture of EC/VC/PC in a weight ratio of 1:1:1. This three part solvent mixture was used in a cell having an anode of SFG-15 and a cathode of $LiMn_2O_4$, this was a full rocking chair battery.

The electrochemical properties were determined using Electrochemical Voltage Spectroscopy (EVS) technique. Electrochemical and kinetic data were recorded using the Electrochemical Voltage Spectroscopy (EVS) technique. Such technique is known in the art as described by J. Barker in Synth. Met 28, D217 (1989); Synth. Met. 32, 43 (1989); J. Power Sources, 52, 185 (1994); and Electrochemica Acta, Vol. 40, No. 11, at 1603 (1995). The present data was obtained in a two electrode cell.

FIG. 1 shows a volt/capacity plot of SFG-15 graphite cycled with a lithium metal electrode using constant current cycling at ±0.4 milliamps per square centimeter, between 2.0 and 0.01 volts versus $Li/Li^+$, using 28.4 milligrams of the SFG-15 active material. The electrolyte is 1 molar $LiPF_6$ in a solvent solution of 50:50 by weight vinylene carbonate (VC) and propylene carbonate (PC). In the first half cycle, lithium is removed from the metallic electrode and intercalated into the graphite electrode. When essentially full intercalation at the graphite electrode is complete, corresponding to about $Li_1C_6$, the voltage has dropped to approximately 0.01 volts, representing approximately 433 milliamp hours per gram corresponding to about 12.3 milliamp hours based on 28.4 milligrams of active material. In the second half cycle, the lithium is deintercalated from the graphite and returned to the metallic electrode until the average voltage is approximately 2 volts versus $Li/Li^+$. The deintercalation corresponds to approximately 345 milliamp hours per gram, representing approximately 9.8 milliamp hours based on 28.4 milligrams of active material. This completes an initial cycle. The percentage difference between the 433 milliamp hours per gram capacity in, and the 345 milliamp hours per gram capacity out, divided by the initial 433 milliamp hours gram capacity in, corresponds to a surprisingly low 20 percent loss. In the last part of FIG. 1, the first half cycle is repeated corresponding to 10.3 milliamp hours.

Figure 2:
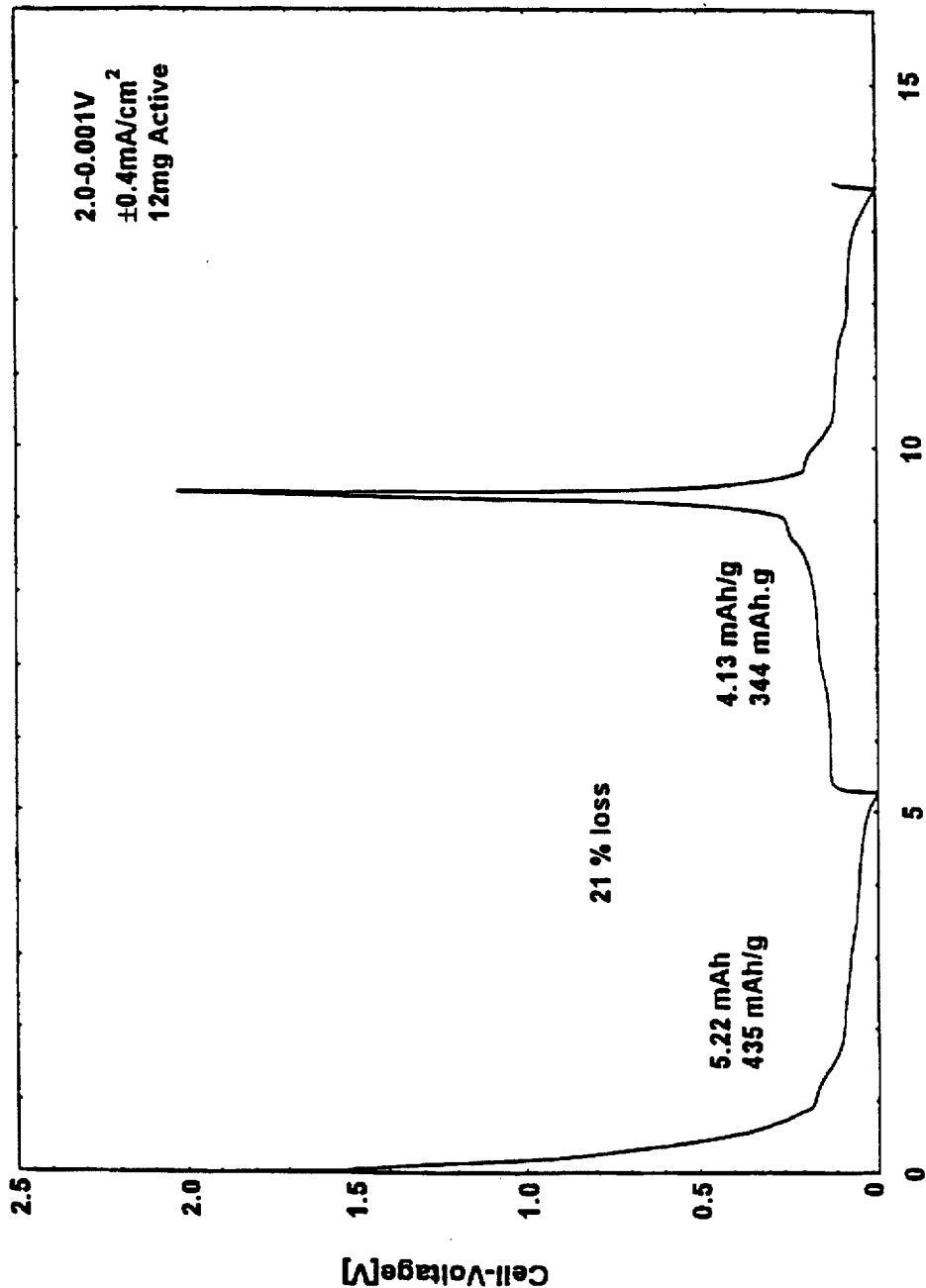
FIG. 2 is a voltage/capacity plot of KS-15 graphite cycled with a lithium metal anode using constant current cycling at ±0.4 milliamps per square centimeter, between 2.0 and 0.001 volts, using 12.0 milligrams of the KS-15 active material. The electrolyte is 1 molar $LiPF_6$ in 50:50 by weight VC:PC solvent.

FIG. 2 shows a voltage capacity plot similar to FIG. 1 except that the graphitic electrode material is KS-15 in FIG. 2, and 12 milligrams of the KS-15 active material is used. In the first half cycle, lithium is removed from the metallic electrode and intercalated into the graphite electrode, and the voltage drops to approximately 0.001 volts, representing approximately 435 milliamp hours per gram corresponding to about 5.22 milliamp hours based on 12 milligrams of active material. In the second half cycle, the lithium is deintercalated from the KS-15 graphite and returned to the metallic electrode, until the average voltage is approximately 2 volts versus $Li/Li^+$. The deintercalation corresponds to approximately 344 milliamp hours per gram, representing approximately 4.13 milliamp hours based on the 12 milligrams of active material. The percentage difference between the first half cycle capacity in, and the second half cycle capacity out, divided by the first half cycle capacity in corresponds to a surprisingly low 21 percent loss. In the last part of FIG. 2, the first half cycle is repeated.

Figure 3:
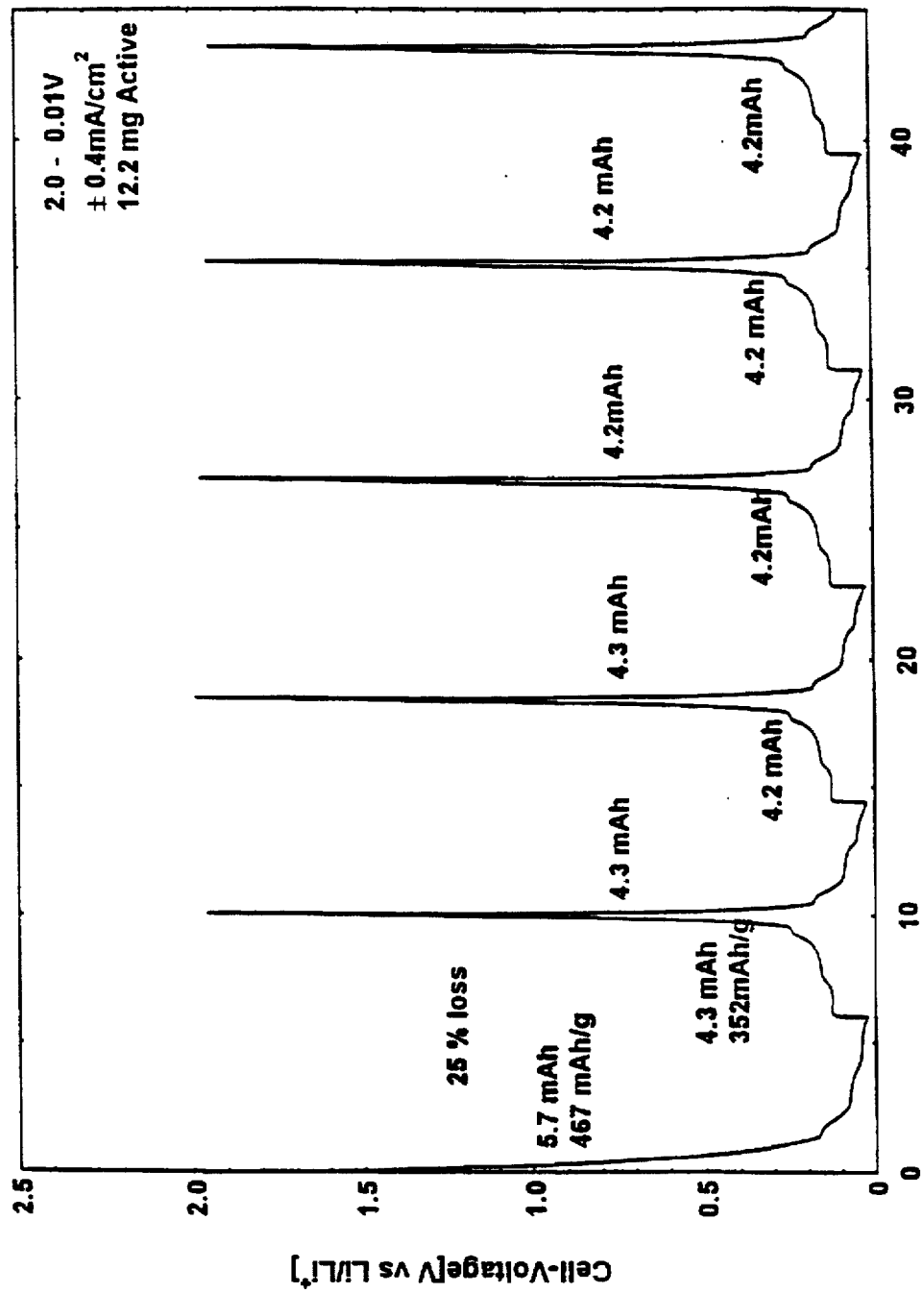
FIG. 3 is a voltage/capacity plot of KS-10 graphite cycled with a lithium metal anode using constant current cycling at ±0.4 milliamps per square centimeter, between 2.0 and 0.01 volts, using 12.2 milligrams of the KS-10 active material. The electrolyte is 1 molar $LiPF_6$ in 50:50 by weight VC:PC solvent.

FIG. 3 shows a voltage capacity plot similar to that of FIGS. 1 and 2 except that additional cycles were shown. In FIG. 3 the active material is KS-10, using 12.2 milligrams of the KS-10 active material in the electrode. In the first half cycle, the voltage drops to approximately 0.01 volts, representing approximately 467 milliamp hours per gram corresponding to approximately 5.7 milliamp hours based on 12.2 milligrams of active material. In the second half cycle, the average voltage reaches approximately 2 volts versus $Li/Li^+$, with deintercalation corresponding to approximately 352 milliamp hours per gram. In the second half cycle, such deintercalation represents approximately 4.3 milliamp hours based on 12.2 milligrams of active material. The percentage difference between the 467 milliamp hours per gram capacity in, and the 352 milliamp hours per gram capacity out, corresponds to a surprisingly low 25 percent loss. In the rest of FIG. 3, the first and second half cycles are repeated in sequence corresponding to 4.3 milliamp hours and 4.2 milliamp hours, respectively, showing the remarkable consistency and cyclability of this cell. In the subsequent cycles shown in FIG. 3, it can clearly be seen that high capacity is effectively maintained.

FIG. 4 shows a voltage capacity plot of lithium manganese oxide ($LiMn_2O_4$) cycled with a lithium metal electrode using constant current cycling at ±0.4 milliamps per square centimeter, between 3.0 and 4.3 volts versus $Li/Li^+$, using 42 milligrams of the $LiMn_2O_4$ active material. The electrolyte is 1 molar $LiPF_6$ in a solvent solution of 50:50 by weight vinylene carbonate and propylene carbonate. In FIG. 4, the first extraction of lithium is not shown. The first intercalation is shown. As shown in FIG. 4, on the first intercalation, lithium ions were intercalated into the lithium manganese oxide (126 mAh/g). This was followed by the second extraction (133 mAh/g) demonstrating the excellent reversibility for the system. A similar cell was prepared using 46 milligrams of $LiMn_2O_4$ cycled as described above, but at ±0.2 milliamps per square centimeter. The cell was cycled to obtain first cycle data. On the first half cycle, lithium ions are deintercalated from the $LiMn_2O_4$, whereupon the electrochemical potential versus lithium of the $LiMn_2O_4$ was about 4.3 volts and the capacity was about 141 milliamp hours per gram (6.50 mAh). Then, in the next half cycle, the ions were intercalated into the lithium manganese oxide resulting in 118 milliamp hours per gram (5.45 mAh). This completed the first full cycle.

FIG. 5 shows a voltage capacity plot of a first electrode (negative electrode) having SFG-15 active material with a loading of approximately 47 milligrams. The counter electrode (positive electrode) is lithium manganese oxide (LiMn$_2$O$_4$). The active material loading of this electrode is 143 milligrams. The solvent comprised equal parts by weight of ethylene carbonate, vinylene carbonate, and propylene carbonate, EC/VC/PC (1:1:1). The salt is 1 molar LiPF$_6$. The conditions of cycling are ±0.5 milliamps per square centimeter, between 2.5 and 4.2 volts. FIG. 5 shows the first cycle charge of the cell whereby lithium is extracted from the lithium manganese oxide electrode for intercalation into the graphite negative electrode, whereupon the potential increases from about 2.4 to about 4.2 volts. The lithium ions transferred to the negative electrode are releasably retained within its structure in a non-metallic state. The positive electrode achieves a specific capacity of about 142 milliamp hours per gram and the anode about 432 milliamp hours per gram (first cycle charge). This corresponds to about 20.3 milliamp hours on initial charge. At this point, at the apex corresponding to about 4.2 volts, deintercalation from graphite (first cycle discharge) occurs from the apex. Lithium is reinserted into the lithium manganese oxide so that the content of lithium, again, increases representing approximately 112 milliamp hours per gram positive electrode, 340 milliamp hours per gram graphite negative electrode, and 16.0 milliamp hours. The difference between the first cycle charge and first cycle discharge on a percentage basis is a remarkably low 21 percent loss.

Table VII provides comparative examples of constant current cycling using 1 molar LiPF$_6$ against a lithium metal counter electrode where the type of active material of the electrode and the electrolyte solvent vary. The performance of VC/PC solvent is shown in Table VII. This successful performance is particularly surprising since VC/PC works with the KS series of graphites whereas a combination of EC/PC does not work with any members of the KS series. Therefore, it was very surprising to find that an electrolyte solvent comprising VC could be used with basically any graphite tried so far. The invention, for the first time, provides a replacement for the typically used electrolyte solvent EC/DMC. DMC is not suitable at relatively higher temperatures due to its low boiling point. This mixed solvent is also limited by EC in its application at relatively low temperatures. In contrast, the VC/PC used as co-solvents in lithium ion batteries with graphites, shows relatively low first cycle loss. This is clearly demonstrated by the VC and PC having been successfully used with various graphites, including the SFG series and the KS series, in lithium ion batteries, without the disadvantages of incompatibility between PC and the graphite (Table VII). Incompatibility between PC and graphite is normally noticed with PC based solvents. (See Table VI-EC/PC.) However, surprisingly, this is not the case with the novel VC/PC co-solvent of the invention. The best performance was observed with SFG-15 graphite. Another advantage of a binary electrolyte is the improved low temperature performance over that of EC based systems, because of the lower melting point of VC as compared to EC.

In summary, the invention solves problems associated with conventional electrolytes. Solvents containing DMC have always been a problem since DMC readily boils off. EC readily solidifies, and it is necessary for the cell to achieve a temperature of 40° C. to melt the EC and prevent it from solidifying. Although PC is a desirable solvent because it is liquid at very low temperatures, it interacts with carbon and deteriorates the carbon anode. The invention provides the ability, for the first time, to utilize the advantages of PC by combining it with VC. VC stays liquid at a temperature below the 40° C. solidification temperature of the comparative EC. VC conveniently maintains its liquid state at about room temperature, having a melting point of about 22° C. Accordingly, advantageously, VC's physical state is a liquid at room temperature. This avoids the difficulties encountered when using EC as a solvent since EC solidifies readily. Yet, the difficulties encountered with EC are also resolved by the invention by combining the EC as a third component in a three part solvent comprising VC/PC/EC. This is in contrast to conventional thinking as exemplified in the '548 patent which recommends avoiding any solvent mixture containing PC. The '548 patent likewise avoids BC due to its tendency to deteriorate carbon anodes. In contrast to the conventional wisdom as exemplified in the '548 patent, the present invention combines VC and PC successfully and uses it with a variety of carbonaceous materials. Accordingly, the basic advantage of using VC/PC or VC/PC/EC, over either EC/PC or EC/DMC (EC/DEC), is the improved low temperature performance. This, of course, is extremely important particularly for vehicle applications. Note that the melting point of EC is about 38° C. and the melting point of VC is about 21° C. The VC in combination with PC has demonstrated unexpected and excellent low temperature performance as evidenced by the rate capability measurements. The combination of EC, VC, and PC shows similar excellent results. This data is much better than EC/DMC and much better than any of the other conventionally used electrolyte solvents.

TABLE I

| Carbon Material | Surface Area (m$^2$/g) (BET) | Coherence Length L$_c$ (nm) | Density (g/cm$^3$)$^2$ | Particle Size[1] | Median Size d$_{50}$ (μm) | Interlayer Distance c/2 (nm) |
|---|---|---|---|---|---|---|
| SFG-6 | 15.2 | >100 | 2.26 | <6 | 3.2 | 0.3355 |
| SFG-10 | 11.1 | >150 | 2.26 | <12 | 5.8 | 0.3355 |
| SFG-15 | 8.8 | >120 | 2.26 | <16 | 8.1 | 0.3355 |
| SFG-44 | 4.2 | <200 | 2.26 | <48 | 22 | 0.3355 |
| KS-10 | 16 | 80 | 2.255 | <12 | 5.9 | 0.3357 |
| KS-15 | 14 | 90 | 2.255 | <16 | 7.7 | 0.3356 |
| KS-25 | 13 | 90 | 2.255 | <24 | 10.5 | 0.3356 |
| BG-35 | 7 | >1000 | 0.195 | <36 | 17 | N/A |
| F-399 | 23 | >1000 | 2.20 | <35 | 16 | N/A |
| MCMB-25-28 | N/A | >1000 | 2.24 | 37 | 22.5 | 0.336 |

[1]Maximum size for at least 90% by weight of graphite particles, interpolated for F-399 based on 87% less than 31 microns (μm), and 96% less than 44 micron (μm).
[2]In xylene.
Note:
SFG and KS series are synthetic, anisotropic graphite. BG series is a flake natural graphite. F series is natural graphite. MCMB series is meso phase micro beads.

TABLE II

Graphite SFG-15 Specifications
Guaranteed Values

| | | |
|---|---|---|
| Ash | (%) max | 0.15 |
| Moisture | (%) max | 0.5 |
| Crystallite Height | (nm) min | 100 |
| Interlayer Distance | (nm) | 0.3354–0.3358 |
| Particle Size <16 micron | (%) min, Laser | 90 |

Typical Values

Purity

| | | |
|---|---|---|
| Ash | (%) | 0.1 |
| Al | (ppm) | 35 |
| As | (ppm) | <1 |
| Ca | (ppm) | 170 |
| Co | (ppm) | <1 |
| Cr | (ppm) | 4 |
| Cu | (ppm) | <1 |
| Fe | (ppm) | 135 |
| Mo | (ppm) | <1 |
| Ni | (ppm) | 3 |
| Pb | (ppm) | <1 |
| Sb | (ppm) | <2 |
| Si | (ppm) | 450 |
| Ti | (ppm) | 7 |
| V | (ppmu) | 2 |
| S | (ppm) | 60 |

Crystallinity

| | | |
|---|---|---|
| LC | (nm) | >120 |
| c/2 ($d_{002}$) | (nm) | 0.3355 |

Density

| | | |
|---|---|---|
| Xylene | (g/ccm) | 2.26 |
| Scott | (g/ccm) | 0.09 |

Specific Surface Area

| | | |
|---|---|---|
| BET | (sqm/g) | 8.8 |

Particle Size Distribution (Laser Diffraction)

| | | |
|---|---|---|
| <2 micron | (%) | 2 |
| <4 micron | (%) | 13 |
| <6 micron | (%) | 30 |
| <8 micron | (%) | 49 |
| <12 micron | (%) | 79 |
| <16 micron | (%) | 94 |
| <24 micron | (%) | 99 |
| <48 micron | (%) | 100 |
| $d_{50}$ | (μm) | 8.1 |

TABLE III

Graphite SFG-6
Particle Size Distribution (Laser Diffraction)

| | | |
|---|---|---|
| <1 micron | (%) | 2.8 |
| <1.5 micron | (%) | 5.7 |
| <2 micron | (%) | 16.9 |
| <3 micron | (%) | 47.7 |
| <4 micron | (%) | 68.8 |
| <6 micron | (%) | 95.8 |
| <8 micron | (%) | 97.3 |
| <12 micron | (%) | 100 |
| $d_{50}$ | (μm) | 3.2 |

Graphite SFG-10
Particle Size Distribution (Laser Diffraction)

| | | |
|---|---|---|
| <1 micron | (%) | 0.4 |
| <2 micron | (%) | 4.8 |
| <4 micron | (%) | 29.5 |
| <6 micron | (%) | 57.1 |
| <8 micron | (%) | 75.3 |
| <12 micron | (%) | 94.9 |
| <16 micron | (%) | 98.5 |
| <32 micron | (%) | 100 |
| $d_{50}$ | (μm) | 5.8 |

TABLE IV

Graphite KS-10 Specifications
Guaranteed Values

| | | |
|---|---|---|
| Ash | (%) max | 0.1 |
| Moisture | (%) max | 0.6 |
| Crystallite Height | (nm) min | 70 |
| Interlayer Distance | (nm) | 0.3354–0.3359 |
| Particle size <12 micron | (%) min, Laser | 90 |

Typical Values

Purity

| | | |
|---|---|---|
| Ash | (%) | 0.06 |
| Moisture | (%) | 0.1 |
| Al | (ppm) | 13 |
| As | (ppm) | <0.5 |
| Ca | (ppm) | 160 |
| Co | (ppm) | <1 |
| Cr | (ppm) | <1 |
| Cu | (ppm) | <1 |
| Fe | (ppm) | 50 |
| Mo | (ppm) | <1 |
| Ni | (ppm) | 2 |
| Pb | (ppm) | <1 |
| Sb | (ppm) | <0.1 |
| Si | (ppm) | 90 |
| Ti | (ppm) | 7 |
| V | (ppm) | 3 |
| S | (ppm) | 50 |

Crystallinity

| | | |
|---|---|---|
| LC | (nm) | 80 |
| c/2 | (nm) | 0.3357 |

Density

| | | |
|---|---|---|
| Xylene | (g/ccm) | 2.255 |
| Scott | (g/ccm) | 0.09 |

Specific Surface Area

| | | |
|---|---|---|
| BET | (sqm/g) | 16 |

Particle Size Distribution (Laser Diffraction)

| | | |
|---|---|---|
| <1 micron | (%) | 0.5 |
| <2 micron | (%) | 5 |
| <4 micron | (%) | 27 |
| <6 micron | (%) | 52 |
| <8 micron | (%) | 72 |
| <12 micron | (%) | 94 |
| <16 micron | (%) | 99.7 |
| <32 micron | (%) | 100 |
| $d_{50}$ | (μm) | 5.9 |

TABLE V

Graphite KS-15 Specifications
Guaranteed Values

| | | |
|---|---|---|
| Ash | (%) max | 0.1 |
| Moisture | (%) max | 0.5 |
| Crystallite Height | (nm) min | 80 |
| Interlayer Distance | (nm) | 0.3354–0.3354 |
| Particle size <12 micron | (%) min, Laser | 90 |

TABLE V-continued

Typical Values

Purity

| | | |
|---|---|---|
| Ash | (%) | 0.06 |
| Moisture | (%) | 0.1 |
| Al | (ppm) | 12 |
| As | (ppm) | <0.5 |
| Ca | (ppm) | 155 |
| Co | (ppm) | <1 |
| Cr | (ppm) | <1 |
| Cu | (ppm) | <1 |
| Fe | (ppm) | 50 |
| Mo | (ppm) | <1 |
| Ni | (ppm) | 2 |
| Pb | (ppm) | <1 |
| Sb | (ppm) | <0.1 |
| Si | (ppm) | 90 |
| Ti | (ppm) | 7 |
| V | (ppm) | 4 |
| S | (ppm) | 40 |

Crystalinity

| | | |
|---|---|---|
| LC | (nm) | 90 |
| c/2 | (nm) | 0.3356 |

Density

| | | |
|---|---|---|
| Xylene | (g/ccm) | 2.255 |
| Scott | (g/ccm) | 0.11 |

Specific Surface Area

| | | |
|---|---|---|
| BET | (sqm/g) | 14 |

Particle Size Distribution (Laser Diffraction)

| | | |
|---|---|---|
| <2 micron | (%) | 3 |
| <4 micron | (%) | 19 |
| <6 micron | (%) | 37 |
| <8 micron | (%) | 54 |
| <12 micron | (%) | 79 |
| <16 micron | (%) | 93 |
| <24 micron | (%) | 99.7 |
| <48 micron | (%) | 100 |
| $d_{50}$ | (μm) | 7.7 |

TABLE VI

Characteristics of Organic Solvents

| | PC | VC | EC | DMC |
|---|---|---|---|---|
| Boiling Temperature (C.) | 240 | 162 | 248 | 91.0 |
| Melting Temperature (C.) | −49 | 22 | 39–40 | 4.6 |
| Density (g/cm³) | 1.198 | 1.35 | 1.322 | 1.071 |
| Solution Conductivity (S/cm) | $2.1 \times 10^{-9}$ | — | $<10^{-7}$ | $<10^{-7}$ |
| Viscosity (cp) at 25° C. | 2.5 | — | 1.86 (at 40° C.) | 0.59 |
| Dielectric Constant at 20° C. | 64.4 | — | 89.6 (at 40° C.) | 3.12 |
| Molecular Weight | 102.0 | 86.047 | 88.1 | 90.08 |
| $H_2O$ Content | <10 ppm | — | <10 ppm | <10 ppm |
| Electrolytic Conductivity (mS/cm) 20° C. 1M $LiAsF_6$ | 5.28 | — | 6.97 | 11.00 (1.9 mol) |

| | DEC | BC | MEC | DPC |
|---|---|---|---|---|
| Boiling Temperature (C.) | 126 | 230 | <126 | 167–168 |
| Melting Temperature (C.) | −43 | — | −55 | — |
| Density (g/cm³) | 0.98 | 1.139 | 1.007 | 0.944 |
| Solution Conductivity (S/cm) | $<10^{-7}$ | $<10^{-7}$ | $6 \times 10^{-9}$ | $<10^{-7}$ |
| Viscosity (cp) at 25° C. | 0.75 | 2.52 | 0.65 | — |
| Dielectric Constant at 20° C. | 2.82 | — | — | — |
| Molecular Weight | 118.13 | 116.12 | 104.10 | 146.19 |
| $H_2O$ Content | <10 ppm | <10 ppm | <10 ppm | <10 ppm |
| Electrolytic Conductivity (mS/cm) 20° C. 1M $LiAsF_6$ | 5.00 (1.5 mol) | <3.7 | — | — |

TABLE VII

Constant Current Cycling 1 Molar $LiPF_6$ Li Metal Counter-Electrode

| Electrolyte Solvent | Active Material | Supplier | Active Mass/[mg] | Reversible Specific Capacity/ [mAh/g] | 1st Cycle Capacity Loss [%] |
|---|---|---|---|---|---|
| VC/PC | SFG-15 | Lonza | 28.4 | 345 | 20 |
| VC/PC | KS-15 | Lonza | 12.0 | 344 | 21 |
| VC/PC | KS-10 | Lonza | 12.2 | 352 | 25 |
| VC/PC | $Li_xMn_2O_4$ | Lonza | 42.0 | 126 | 4 |
| EC/PC | SFG-15 | Lonza | 12.0 | 351 | 18 |
| EC/PC | KS-15 | Lonza | 12.2 | 105 | 95 |
| EC/PC | KS-10 | Lonza | 17.5 | 74 | 89 |
| DMC/PC | SFG-15 | Lonza | 18.1 | 0 | 100 |

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

We claim:

1. An electrochemical cell which comprises a first electrode, a counter electrode which forms an electrochemical couple with said first electrode, and an electrolyte:

a. said first electrode consisting essentially of graphite particles and a binder, where on the basis of 100 parts by weight, said binder constitutes up to about 15 parts and said graphite particles constitute at least about 85 parts; said graphite particles having an interlayer distance spacing of 002 planes ($d_{002}$) as determined by x-ray diffraction of 0.330 to 0.340 nanometers (nm), a crystallite size in the direction of c-axis ($L_c$) being at least about 90 nanometers (nm) and less than about 1000 nanometers (nm), a BET surface area of greater than about 4 square meters per gram ($m^2/g$) and up to about 16 square meters per gram ($m^2/g$), and at least 90 percent by weight of said graphite particles having a size less than 25 microns ($\mu m$); and said electrolyte comprising a solute and a solvent mixture; said solute consisting essentially of a salt of a metal; said solvent mixture consisting essentially of propylene carbonate (PC), vinylene carbonate (VC) or a substituted derivative thereof, and optionally one or more other organic solvents; with the propylene carbonate being present in an amount by weight which is not greater than the combined amount of said vinylene carbonate or its derivative and any said other solvent.

2. The electrochemical cell according to claim 1 wherein said solvent mixture consists of said VC or its derivative and said PC in a weight ratio of said vinylene carbonate or its derivative to said propylene carbonate of 80:20 to 20:80.

3. The electrochemical cell according to claim 2 wherein said one or more other organic solvents is selected from the group consisting of ethylene carbonate (EC), dimethyl carbonate (DMC), diethyl carbonate (DEC), dipropyl carbonate (DPC), dibutyl carbonate (DBC), diethoxy ethane (DEE), ethyl methyl carbonate (EMC), butylene carbonate (BC), and mixtures thereof.

4. The electrochemical cell according to claim 1 wherein said solvent mixture further comprises ethylene carbonate (EC).

5. The electrochemical cell according to claim 4 wherein the relative amounts by weight of said VC or its derivative, said PC, and said EC are about the same.

6. An electrochemical cell which comprises a first electrode, a counter electrode which forms an electrochemical couple with said first electrode, and an electrolyte; said first electrode comprising graphite particles, and said electrolyte comprising a solvent mixture and a solute; said solvent mixture comprising vinylene carbonate (VC) or a substituted derivative thereof and propylene carbonate (PC).

7. The electrochemical cell according to claim 6 wherein said solvent mixture consists of said VC or its derivative and said PC in a weight ratio of said vinylene carbonate or its derivative to said propylene carbonate of 80:20 to 20:80.

8. The electrochemical cell according to claim 6 wherein said solvent mixture consists of said PC and said VC or its derivative, and one or more other organic solvents having a boiling point of about 80° C. to about 300° C. and forming a solute with lithium salts.

9. The electrochemical cell according to claim 8 wherein said one or more other organic solvents is selected from the group consisting of ethylene carbonate (EC), dimethyl carbonate (DMC), diethyl carbonate (DEC), dipropyl carbonate (DPC), dibutyl carbonate (DBC), diethoxy ethane (DEE), ethyl methyl carbonate (EMC), butylene carbonate (BC), and mixtures thereof.

10. The electrochemical cell according to claim 8 wherein the relative amounts by weight of said solvents are selected to provide the amount of said PC being less than the combined about of said VC or its derivative and said one or more other solvents.

11. The electrochemical cell according to claim 6 wherein said solvent mixture further comprises ethylene carbonate (EC).

12. The electrochemical cell according to claim 11 wherein the relative amounts by weight of said VC or its derivative, said PC, and said EC are about the same.

13. The electrochemical cell according to claim 6 wherein said graphite particles have an interlayer distance spacing of 002 planes ($d_{002}$) as determined by x-ray diffraction of 0.330 to 0.340 nanometers (nm), a crystallite size in the direction of c-axis ($L_c$) being greater than about 90 nanometers (nm) and less than about 1000 nanometers, and at least 90 percent by weight of said graphite particles having a size less than about 25 microns ($\mu m$).

14. The electrochemical cell according to claim 13 wherein said graphite particles have a BET surface area greater than about 4 square meters per gram ($m^2/g$) and up to about 16 meters square per gram ($m^2/g$).

15. The electrochemical cell according to claim 13 wherein the crystallite size ($L_c$) is greater than about 100 nanometers (nm) and less than about 200 nanometers (nm).

16. The electrochemical cell according to claim 6 wherein said electrolyte further comprises a separator in the form of a solid matrix forming a network with voids interpenetrated by said solvent mixture and said solute.

17. The electrochemical cell according to claim 16 wherein said matrix is selected from the group consisting of polymeric acrylate, porous polypropylene, porous polyethylene, and glass fiber material.

18. The electrochemical cell according to claim 6 wherein said counter electrode comprises an intercalation active material.

19. The electrochemical cell according to claim 6 wherein said first electrode is a negative electrode and said counter electrode is a positive electrode comprising a lithium transition metal oxide compound.

20. The electrochemical cell according to claim 19 wherein said lithium transition metal oxide compound is selected from the group consisting of $LiMn_2O_4$, $LiNiO_2$, $LiCoO_2$, $LiNiVO_4$, $LiCoVO_4$, $LiCoNiO_2$, and mixtures thereof.

21. The electrochemical cell according to claim 20 wherein said lithium transition metal is lithium manganese oxide.

22. The electrochemical cell according to claim 6 wherein said first electrode consists essentially of said graphite and a binder.

23. The electrochemical cell according to claim 22 wherein on a basis of 100 parts by weight, said binder constitutes up to about 15 parts and said graphite at least about 85 parts.

24. The electrochemical cell according to claim 6 wherein said substituted derivative of VC is obtained by replacing at least one hydrogen atom of said VC with a substituent selected from the group consisting of halogens and alkyls having 1 to 3 carbon atoms.

25. The electrochemical cell according to claim 11 wherein said VC or substituted derivative thereof has a melting point less than that of said EC.

* * * * *